United States Patent
Yang et al.

(10) Patent No.: US 10,784,976 B2
(45) Date of Patent: Sep. 22, 2020

(54) NANOSECOND ACCURACY OF TIMESTAMPING BY LEVERAGING ALIGNMENT MARKER AND METHOD FOR PRODUCING THE SAME

(71) Applicant: GLOBALFOUNDRIES Inc., Grand Cayman (KY)

(72) Inventors: Kai Yang, Beijing (CN); Adrian Butter, Hilton Head, SC (US); Bin Sun, Beijing (CN); Yijian Qi, Beijing (CN); Jilei Yin, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/196,970

(22) Filed: Nov. 20, 2018

(65) Prior Publication Data

US 2020/0162179 A1  May 21, 2020

(51) Int. Cl.
*H04J 3/06* (2006.01)

(52) U.S. Cl.
CPC ......... *H04J 3/0667* (2013.01); *H04J 3/067* (2013.01); *H04J 3/0697* (2013.01)

(58) Field of Classification Search
CPC ......... H04J 3/0667; H04J 3/067; H04J 3/0697
USPC ...................................... 370/464, 498, 503
See application file for complete search history.

(56) References Cited

U.S. PATENT DOCUMENTS

| | | |
|---|---|---|
| 8,971,352 B2 | 3/2015 | Jost |
| 9,602,271 B2 | 3/2017 | Benjamini et al. |
| 2008/0080562 A1* | 4/2008 | Burch ............... H04L 43/0858 370/503 |
| 2008/0117938 A1* | 5/2008 | Erich ................. H04J 3/0697 370/503 |
| 2015/0163000 A1* | 6/2015 | Aweya ............... H04L 7/033 370/519 |

* cited by examiner

*Primary Examiner* — Obaidul Huq
(74) *Attorney, Agent, or Firm* — Ditthavong & Steiner P.C.

(57) ABSTRACT

A system and apparatus for obtaining clock synchronization of networked devices and related method are provided. Embodiments include a computer-implemented system, including a primary device having a first high accuracy timestamping assist (HATA) unit attached to a first physical layer; a first time stamping unit; a first clock control; a first medium access control layer connected to the first time stamping unit and the first physical layer via a medium independent interface. A secondary device includes a second HATA unit attached to a second physical layer; a second timestamping unit; a second clock control. The first and second HATA units are configured to detect a departure time, an arrival time, or a combination thereof of a first alignment marker over transmitter serializer and receiver deserializer interfaces of a data transmission between the primary device and the secondary device.

23 Claims, 6 Drawing Sheets

NANOSECOND ACCURACY OF TIMESTAMPING BY LEVERAGING ALIGNMENT MARKER AND METHOD FOR PRODUCING THE SAME

TECHNICAL FIELD

The present disclosure relates to clock synchronization of networked devices of a communication network. The present disclosure is particularly applicable to the standard for precision clock synchronization protocol for networked measurement and control systems.

BACKGROUND

Clock synchronization protocols, e.g., Network Time Protocol (NTP) and the Institute of Electrical and Electronics Engineers (IEEE) 1588-2008, are used for a precision clock synchronization of networked measurement and control devices and are commonly integrated in communication networks, such as Ethernet. The accuracy of these mechanisms is very important and highly affects the accuracy of clocking systems. Sub nanosecond accuracy has emerged as a requirement for high performance applications, and is especially applicable to achieve clock synchronization when the number of nodes in the network grows rapidly.

Normally, clock synchronization is done by sending 3 or 4 precision time protocol (PTP) messages between a primary device and one or more secondary devices. Based on the 3 or 4 PTP messages, a secondary device can get four timestamps, which the secondary device can then use to calculate the clock offset and link latency between the primary device and itself. However, synchronization between the clocks will be accurate if the link latency is symmetrical. Otherwise, further correction is needed to synchronize the primary and secondary devices.

Within a typical implementation of IEEE-1588-2008 integrated in a 100 gigabit (Gb) Ethernet link, timestamps are captured on the interface between a medium access control layer and a physical layer or a higher level and only a medium access control clock can be used to record timestamps. However, typical physical layer implementations introduce timing uncertainty that can result in variable latency of timestamp packets going through the physical layer (for example, gearbox functions, asynchronous first in first out (FIFO) structures, forward error correcting (FEC) syndrome processing logic, alignment marker insertion, etc). Thus, achieving high accuracy timestamping at or below one nanosecond between link partners with typical physical layer implementations is difficult.

A need therefore exists for methodology and a resulting apparatus enabling nanosecond or less network clock synchronization accuracy.

SUMMARY

An aspect of the present disclosure is a method of generating timestamps on both a transmitter (TX) path and a receiver (RX) path of an Ethernet system with nanosecond or less accuracy by leveraging an alignment marker and IEEE 1588-2008 2-step protocol operation.

Another aspect of the present disclosure is an apparatus that generates timestamps on both TX and RX paths of an Ethernet system with nanosecond or less accuracy under IEEE 1588-2008 2-step protocol.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a computer-implemented system, including a primary device having a first high accuracy timestamping assist (HATA) unit attached to a first physical layer; a first time stamping unit; a first clock control; a first medium access control layer connected to the first time stamping unit and the first physical layer via a Medium Independent Interface (MII). A secondary device includes a second HATA unit attached to a second physical layer; a second timestamping unit; a second clock control; a second medium access control layer connected to the second timestamping unit and the second physical layer via the MII. The first and second HATA units are configured to detect a departure time, an arrival time, or a combination thereof of a first alignment marker over TX serializer and RX deserializer interfaces of a data transmission between the primary device and the secondary device.

According to the present disclosure, some technical effects may be achieved in part by an apparatus including: a processor; and a memory including computer program code for one or more programs, the memory and the computer program code configured to, with the processor, cause the apparatus to perform the following: detect a departure time, an arrival time, or a combination thereof of a first alignment marker over TX serializer and RX deserializer interfaces of a data transmission between a primary device and a secondary device; measure a time delay from the first alignment marker to a start of a next timestamp packet over MIIs; and map the time delay determined over the MII to the departure time, the arrival time, or a combination thereof detected over the TX serializer and RX deserializer interface to synchronize timestamping between the primary device and the secondary device.

Another aspect of the present disclosure is a method including: detecting a departure time, an arrival time, or a combination thereof of a first alignment marker over the TX serializer and RX deserializer interfaces of a data transmission between a primary device and a secondary device. A time delay is measured from the first alignment marker at the TX serializer and RX deserializer interfaces to a start of a next timestamp packet over an MII of the data transmission between the primary device and the secondary device. The time delay determined over the MII is mapped to the departure time, the arrival time, or a combination thereof detected over the TX serializer and RX deserializer interfaces to synchronize timestamping between the primary device and the secondary device.

A further aspect of the present disclosure is a non-transitory computer-readable storage medium encoded with instructions that, when loaded into a computer, establish a machine performing a computer-implemented method. The computer-implemented method includes detecting a departure time, an arrival time, or a combination thereof of a first alignment marker over TX serializer and RX deserializer interfaces of a data transmission between a primary device and a secondary device. A time delay is measured from the first alignment marker at the TX serializer and RX deserializer interfaces to a start of a next timestamp packet over an MII of the data transmission between the primary device and the secondary device. The time delay determined over the MII is mapped to the departure time, the arrival time, or a combination thereof detected over the TX serializer and RX deserializer interfaces to synchronize timestamping between the primary device and the secondary device.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves the current problems of an increasing number of network nodes running applications that require nanosecond or less timestamp accuracy, non-symmetrical link latency between primary and secondary devices, and uncertainty factors impacting the latency of timestamps going through a physical layer of an Ethernet system attendant upon achieving nanosecond or less communication network clock synchronization. The problems are solved, inter alia, by determining exact time of a next timestamp packet, such as a start frame delimiter (SFD) of a precision timing protocol (PTP) message over TX serializer and RX deserializer interfaces of an Ethernet network based on the detected departure and/or arrival times of an alignment marker (AM) and the time delay between the next timestamp packet and the alignment marker under IEEE 1588-2008 2-step protocol.

Methodology in accordance with embodiments of the present disclosure includes detecting a departure time, an arrival time, or a combination thereof of a first alignment marker over TX serializer and RX deserializer interfaces of a data transmission between a primary device and a secondary device; measuring a time delay from the first alignment marker to a start of a next timestamp packet over an MII of the data transmission between the primary device and the secondary device; and mapping the time delay determined over the MII to the departure time, the arrival time, or a combination thereof detected over the TX serializer and RX deserializer interfaces to synchronize timestamping between the primary device and the secondary device.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

Figure 1:
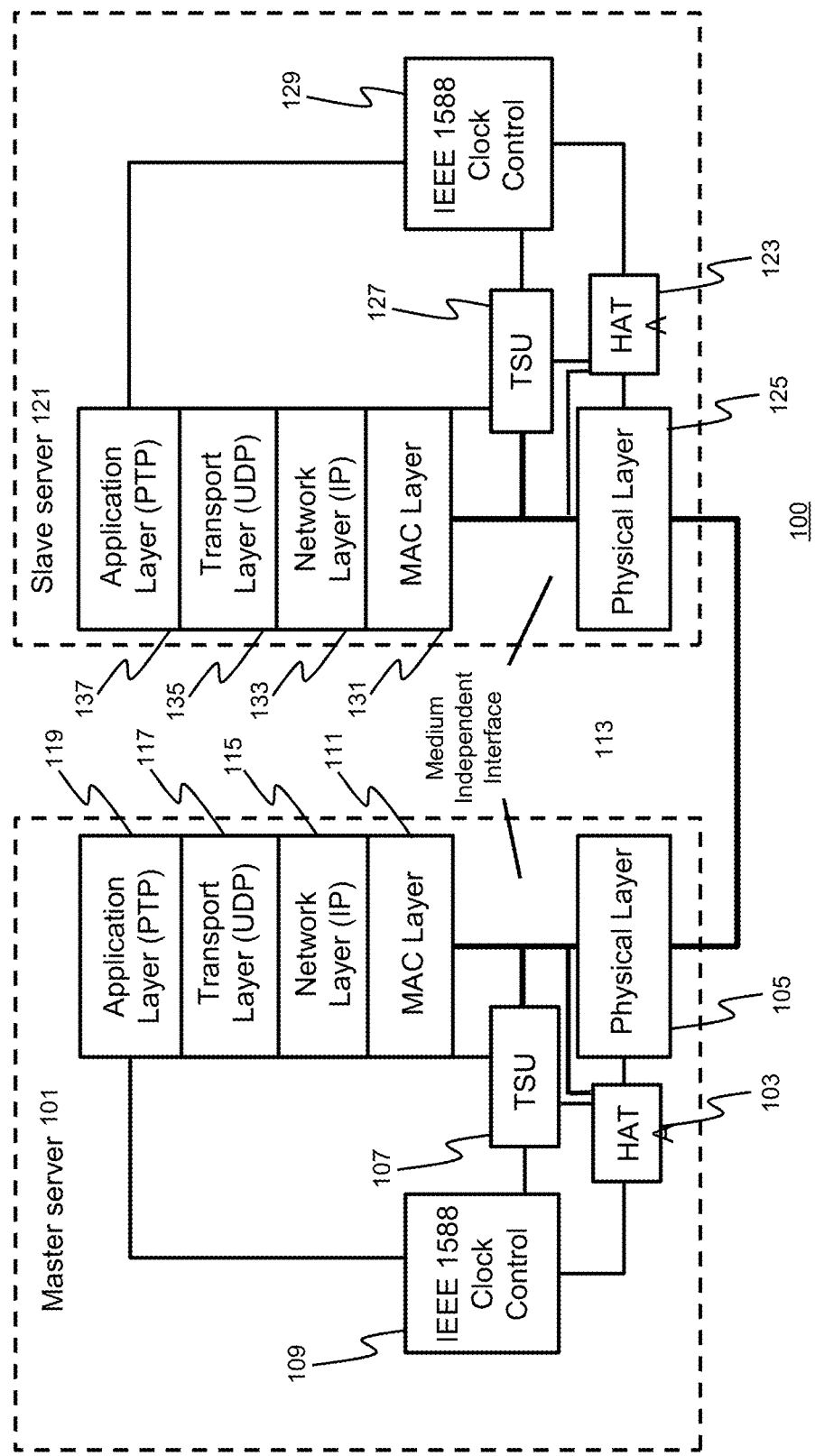
FIG. 1 schematically illustrates a block diagram of a timestamping unit with a HATA unit in an Ethernet system, in accordance with an exemplary embodiment.

FIG. 1 schematically illustrates a block diagram of an Ethernet system containing a timestamping unit (TSU) with a HATA unit, in accordance with an exemplary embodiment. Referring to FIG. 1, an Ethernet system 100 includes a primary device 101 with a HATA unit 103 attached to a physical layer (PHY) 105, a TSU 107, an MII 113, and an IEEE 1588 clock control 109. The primary device 101 also includes a medium access control (MAC) layer 111 that is connected to the TSU 107 and the physical layer 105 via an MII 113. Further, the primary device 101 includes a network layer (IP) 115, a transport layer (UDP) 117, and an application layer (PTP) 119, which is connected to the TSU 107 and the IEEE 1588 clock control 109.

The Ethernet system 100 also includes a secondary device 121 that similarly includes a HATA unit 123 attached (as close as possible) to a physical layer (PHY) 125, a TSU 127, an MII 113, and an IEEE 1588 clock control 129. The secondary device 121, like the primary device 101, also includes a MAC layer 131 that is connected to the TSU 127 and the PHY 125 via the MII 113. Further, the secondary device 121, like the primary device 101, includes a network layer (IP) 133, a transport layer (UDP) 135, and an application layer (PTP) 137, which is connected to the TSU 127 and the IEEE 1588 clock control 129. Specifically, to achieve high accuracy for the detected absolute time value of timestamp packets between the primary device 101 and the secondary device 121, the HATA units 103 and 123 should be located as close as possible to the physical layers 105 and 125, respectfully.

In one instance, the main function of the HATA 103 and 123 is to continuously detect arrival and/or departure times of an AM as the basis for determining the exact time of an SFD for the next timestamp packet, and then report the captured timestamps to the TSU 107 and 127. An alignment marker is a specific pattern used for data synchronization of multi-lane links, and is transmitted periodically on each lane of the PHY 105. Each lane of transmitting PHY 105 composing the link carries a unique alignment marker. As an example, an Ethernet 100GBASE-R4 link is composed of 4 lanes, and each lane transmits 5 64-bit distinct patterns periodically. Receiving PHY 125 uses these distinct patterns to align the data of each received lane, as well as to determine the proper ordering of data received on multi-lane links. An AM is detectable on or inside TX serializer and RX deserializer interfaces and as such, it is possible to capture the AM departure and arrival times on those interfaces with the present methodology.

Figure 2:
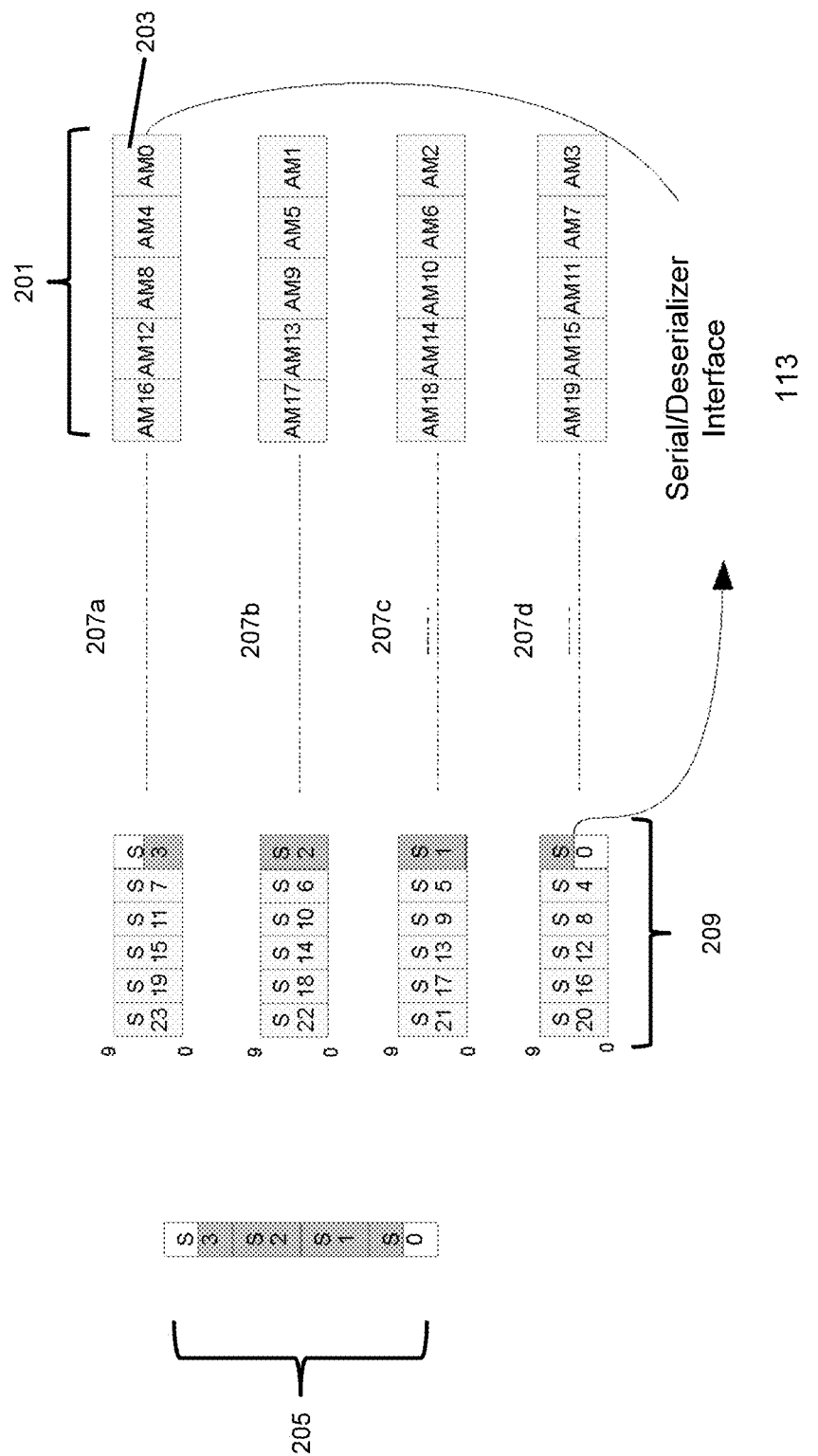
FIG. 2 schematically illustrates a block diagram of timestamping within an Ethernet link using an MII interface.

FIG. 2 illustrates an example data stream appearing on an Ethernet 100GBASE-KR4 link, which includes four serializer/deserializer lanes of 25 Gbit/s each. As shown in FIG. 2, since an alignment mark pattern 201 can be detected on or inside TX serializer and RX deserializer interfaces, exact departure and arrival times of AM0 203 can be obtained. The SFD pattern 205 can be distributed to multiple physical lanes 207a through 207d on TX serializer and RX deserializer interfaces. When the time delay from the previous AM0 203 to the SFD of timestamp packet 209 is determined, AM0 203 can be used as a reference to obtain the departure and arrival times of SFD 209. Measuring the time delay from the position of the SFD to the position of the previous AM0 is achieved on MII 113 (FIG. 1), even when the SFD 205 is scrambled and distributed to multiple serializer/deserializer physical lanes 207a through 207d by PHY 105. The present methodology is used to measure this time delay on MII 113 and map this time delay to the TX serializer and RX deserializer interfaces.

Figures 3A, 3B:
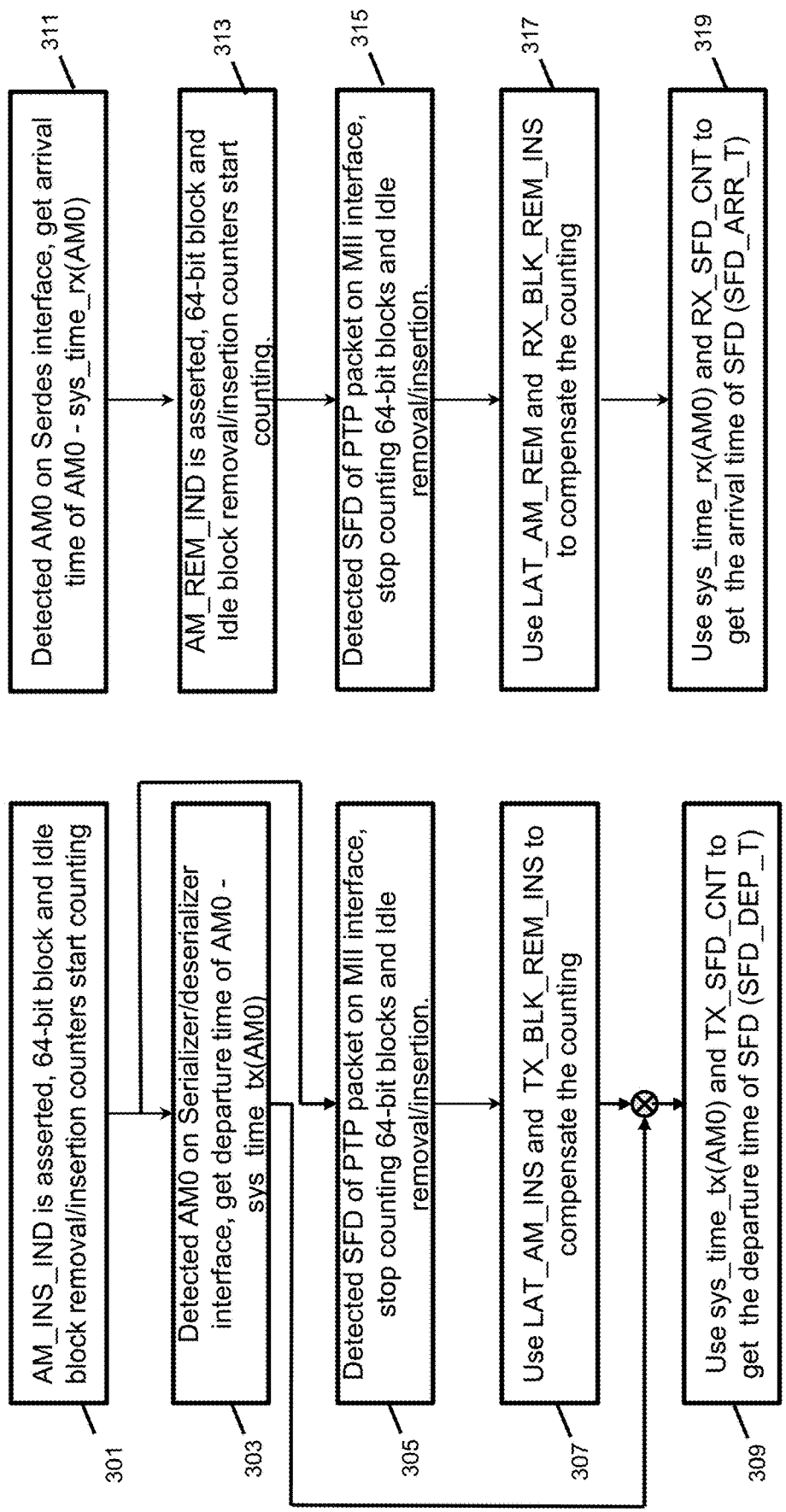
FIGS. 3A and 3B illustrate TX and RX timestamping flows related to FIGS. 3C and 3D, respectively, with HATA units, in accordance with an exemplary embodiment.
Figure 3C:
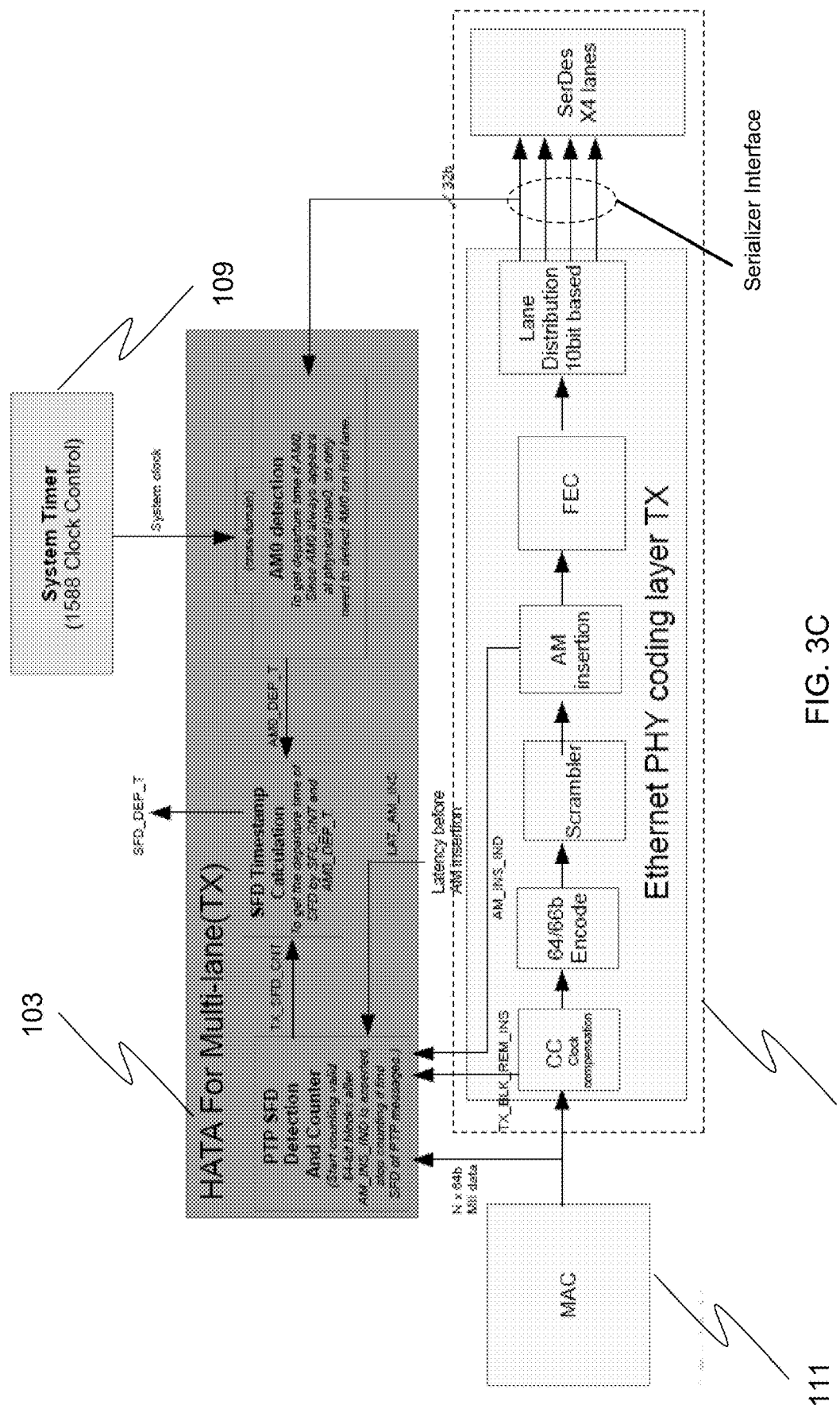
FIGS. 3C and 3D provide a more detailed block diagram illustrations of TX and RX timestamping with HATA units, in accordance with an exemplary embodiment.

FIG. 3C schematically illustrates in greater detail functions appearing in PHY 105 and HATA 103, and particularly illustrates connections to and from HATA 103, in accordance with an exemplary embodiment. The connections and processing blocks associated with HATA 103 support the flowchart illustration of FIG. 3A.

Figure 3D:
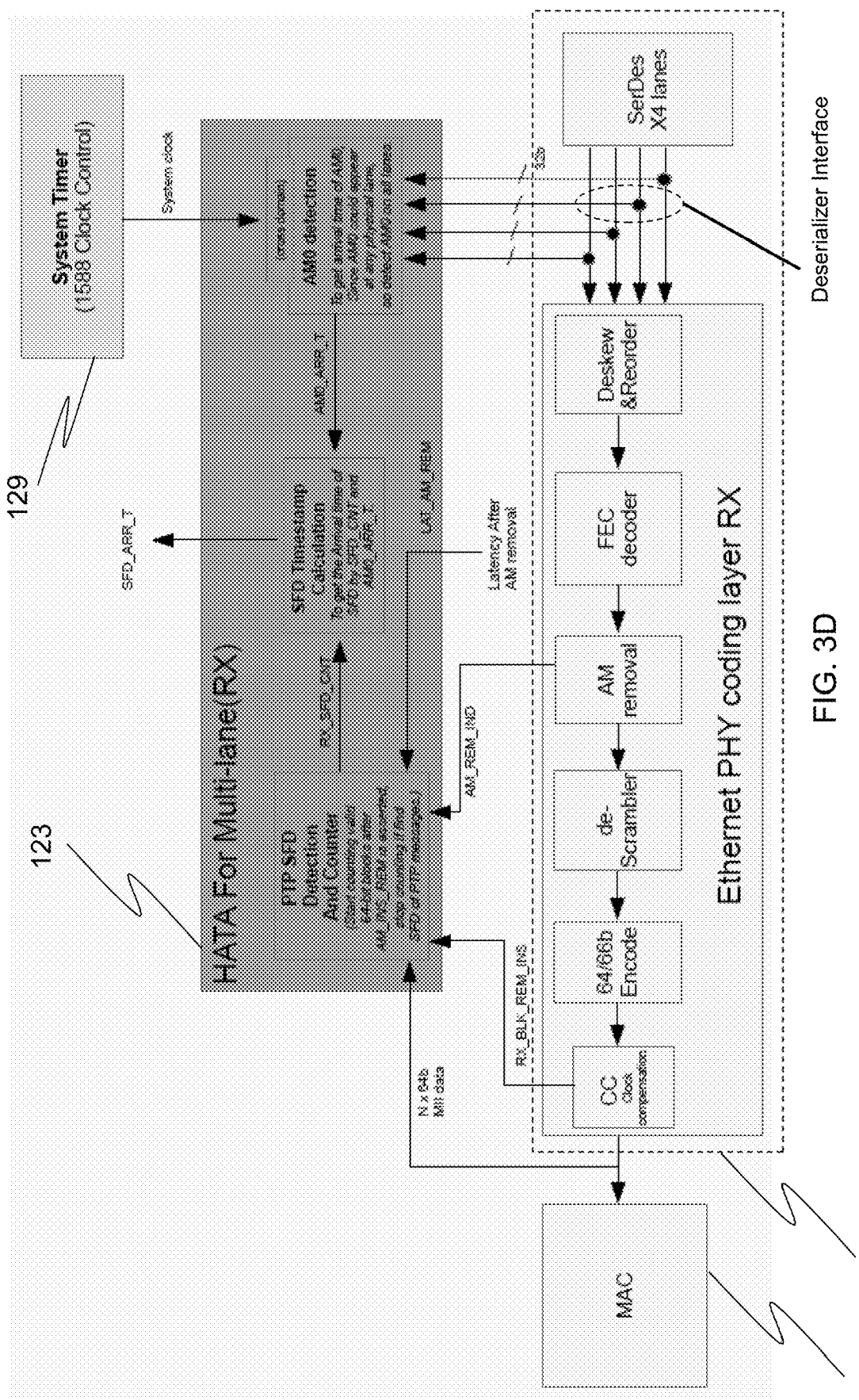

FIG. 3D schematically illustrates in greater detail functions appearing in PHY 125 and HATA 123, and particularly illustrates connections to and from HATA 123, in accordance with an exemplary embodiment. The connections and processing blocks associated with HATA 123 support the flowchart illustration of FIG. 3B.

FIG. 3A schematically illustrates a flowchart using HATA for multi-lane TX timestamping, in accordance with an exemplary embodiment. At periodic time intervals specified by the Ethernet standard, PHY 105 inserts an AM into the data stream and asserts the AM insertion indicator AM_INS_IND (Step 301). A counter counts (Step 301) the number of 64-bit blocks transmitted across the MII interface after AM_INS_IND is asserted. Valid 64-bit blocks that are transmitted across the MII between MAC Layer 111 and PHY 105 are counted. In addition, another counter (TX_BLK_REM_INS) counts (Step 301) whenever an Idle block is removed from (add 1) or inserted into (subtract 1) the data stream to compensate for clock drift and/or AM insertion. Next, when AM0 is transmitted on the serializer interface, the AM0 departure time (sys_time_tx(AM0)) is obtained (Step 303). Concurrently, when the SFD of the next timestamp packet is transmitted on the MII interface, both the 64-bit block counter and Idle block removal/insertion counter stops (Step 305). In particular, upon detection of the SFD of the next timestamp packet on the MII, counting is stopped to subsequently generate a TX SFD count (TX_SFD_CNT).

Figure 4:
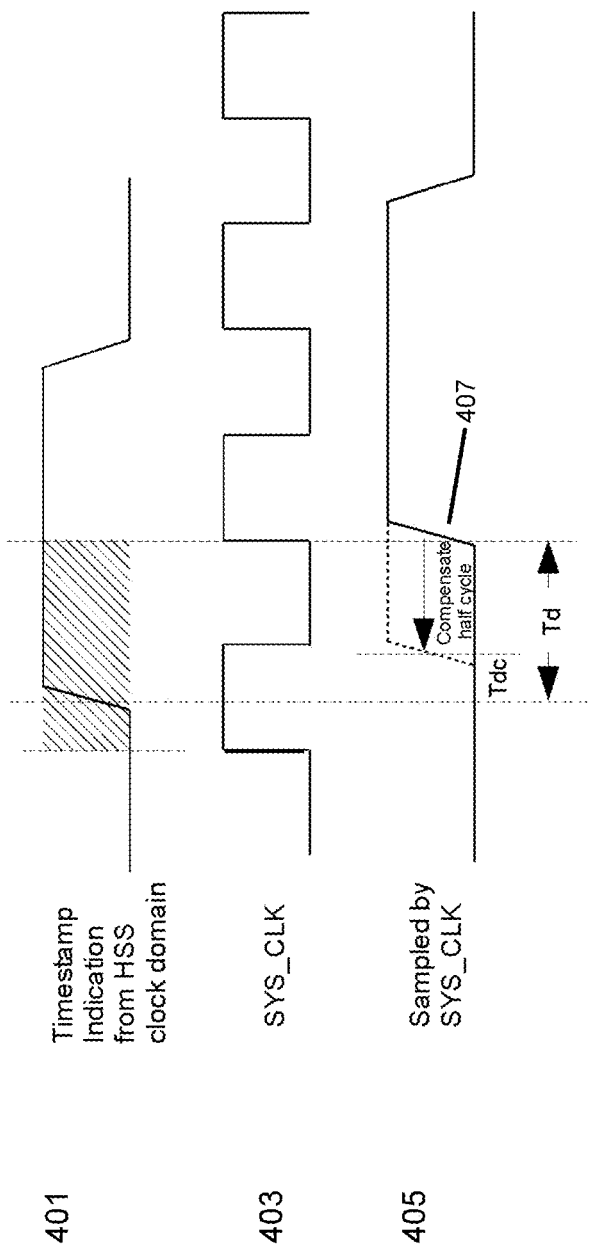
FIG. 4 schematically illustrates a compensation method for sample delay of the departure and arrival times of the Start Frame Delimiter (SFD) of a PTP message at the TX serializer and RX deserializer interfaces, respectively, in accordance with an exemplary embodiment.

Since the AM is inserted within PHY 105, and not on the MII interface where the SFD is detected, the time delay between AM insertion and subsequent detection of the SFD is measured relative to the MII interface. Within PHY 105, several pipeline stages between the MII interface at which the SFD is input and the point at which AM insertion occurs may be implemented. Therefore information regarding the latency of data flow from the MII interface to the AM insertion point is available based on the implementation of PHY 105. LAT_AM_INS is a fixed latency (from MII data input to where AM insertion occurs). Both (TX_BLK_REM_INS) and LAT_AM_INS are used as adjustments to the number of 64-bit blocks counted (Step 307). Thus, the time delay between the AM insertion point and when the SFD of the PTP message (TX_SFD_CNT) is computed from the 64-bit block count with adjustments for the latency before AM insertion (LAT_AM_INS) and any Idle block removal and/or insertion (TX_BLK_REM_INS). The sys_time_tx(AM0) and TX_SFD_CNT are used to obtain the SFD departure time (SFD_DEP_T) (Step 309). In other words, SFD_DEP_T is generated based on the sys_time_tx(AM0) and TX_SFD_CNT. As illustrated above, TX_SFD_CNT provides a cycle-accurate departure time which accounts for all processing steps performed within PHY 105 except for sampling uncertainty when serializing the data stream. To compensate for such sampling uncertainty, an additional half period of time of a system clock (SYS_CLK) is subtracted from the captured (sys_time_tx(AM0)) prior to generating the SFD_DEP_T (FIG. 4). The SFD_DEP_T can then be reported to TSU 107 logic to support additional timestamp processing functions.

In the example of FIG. 3A, a HATA unit identifies AM patterns, detects the AM0 and uses it as a transmission time reference, generates and adjusts the TX_SFD_CNT, generates the SFD_DEP_T, and reports the SFD_DEP_T to the TSU 107, with the HATA unit located as close as possible to PHY 105.

FIG. 3B schematically illustrates a flowchart using HATA to achieve high accuracy timestamping of the received bit stream for a multi-lane link, in accordance with an exemplary embodiment. The receive path of FIG. 3B is similar to the transmit path of FIG. 3A. A time delay from detecting AM0 on the deserializer interface to detecting SFD on the MII is determined (Steps 311 through 317). When the AM0 is detected on the deserializer interface, the AM0 arrival time (sys_time_rx(AM0)) is captured (Step 311). AM0 on the deserializer interface is detected on any lane into PHY 125 to identify the sys_time_rx (AM0).

After the AM removal indicator (AM_REM_IND) is asserted by PHY 125, valid 64-bit blocks are counted on the MII (Step 313) between PHY 125 and MAC Layer 131. In addition, another counter (RX_BLK_REM_INS) counts (Step 313) whenever an Idle block is removed from (add 1) or inserted into (subtract 1) the data stream to compensate for clock drift and/or AM removal. Once the SFD of the next timestamp packet is discovered, 64-bit block and Idle removal/insertion counting is stopped (Step 315).

Latency after AM removal (LAT_AM_REM) is a fixed latency from the point at which AM removal occurs to where MII data is output. Both (RX_BLK_REM_INS) and LAT_AM_REM are used for counting adjustment (Step 317). To obtain the arrival time of the SFD for the next timestamp packet (SFD_ARR_T), both the receiver path (RX) SFD count (RX_SFD_CNT) and (sys_time_rx(AM0)) are used (Step 319). In addition, to compensate for sampling uncertainty, a half period of time of a system clock (SYS_CLK) is subtracted from the captured (sys_time_rx (AM0)) prior to generating SFD_ARR_T (FIG. 4). The SFD_ARR_T can then be reported to the timestamp unit (TSU 127) logic. In some implementations of PHY 125, clock compensation (CC) logic is not included, thereby eliminating the need for RX_BLK_REM_INS and TX_BLK_REM_INS as adjustments to the 64-bit block counts.

In the example of FIG. 3B, a HATA unit identifies AM patterns, detects the AM0 and uses it as a reception time reference, generates and adjusts the RX_SFD_CNT, generates the SFD_ARR_T, and reports the SFD_RR_T to the TSU 127, with the HATA unit located as close as possible to PHY 125.

FIG. 4 schematically illustrates compensation for sampling delay of the departure and arrival times of a SFD of a PTP message at the serializer and deserializer interfaces of PHY 105 and PHY 125, respectively, in accordance with an exemplary embodiment. As demonstrated above with respect to FIGS. 3A and 3B, based on the method employed to compute the departure time and arrival time of the SFD of the timestamp packet at the TX serializer and RX deserializer interfaces, respectively, most of the uncertainty factors in generating timestamps can be eliminated, including all uncertainties in the MAC Layers (111 and 131), and PCS and FEC functions contained in PHY 105 and PHY 125. The only uncertainty that impacts accuracy is clock domain crossing when capturing the AM departure and arrival times to and from the serializer and deserializer function of PHY 105 and PHY 125, respectively. Since AM detection is done at the serializer and deserializer interfaces which operate in the serializer/deserializer interface clock domain 401, if a system clock (SYS_CLK) is used to capture AM0 departure and/or arrival times, it will introduce at most one SYS_CLK cycle of delay 403, as shown in FIG. 4.

For example, if a 1 GHz system clock is used to sample the time at which the AM is detected at the serial/deserializer interface within PHY 105 and PHY 125, a half period time of SYS_CLK 403 is subtracted at both the transmit and receive sides of the link to compensate for sampling uncertainty Since sampling uncertainty applies to both PHY 105 and PHY 125, the total worst case sampling uncertainty will be the sum of the uncertainties in PHY 105 and PHY 125 (e,g, assuming ideal 1 GHz clocks used in PHY 105 and PHY 125, the sum of the uncertainties is (0.5+0.5)=1 nanosecond).

As shown by the above discussion, functions relating to the timestamping operation are controlled by a control computer. Additional processors maybe used by those skilled in the art to process data and control devices are required by the computer architecture design. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming; including executable code as well as associated stored data, e.g. files used for the workflow templates for a number of production jobs as well as the various files for tracking data accumulated during one or more productions runs. The software code is executable by the general-purpose computer that functions as the control processor and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for timestamping, in essentially the manner performed in the implementations discussed and illustrated herein.

For example, a control computer may be a PC based implementation of a central control processing system, or may be implemented on a platform configured as a central or host computer or server. Such a system typically contains a central processing unit (CPU), memories and an interconnect bus. The CPU may contain a single microprocessor (e.g. a Pentium microprocessor), or it may contain a plurality of microprocessors for configuring the CPU as a multiprocessor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case timestamping. The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art.

The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps regarding the timestamping, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The embodiments of the present disclosure can achieve several technical effects, including nanosecond or less accuracy of timestamping. The present disclosure enjoys industrial applicability in any of various industrial applications, e.g., networking, communication network, telecom equipment, microprocessors, smart phones, mobile phones, cellular handsets, set-top boxes, DVD recorders and players, automotive navigation, printers and peripherals, gaming systems, and digital cameras. The present disclosure therefore enjoys industrial applicability in any of various types of networked devices and communication networks utilizing clock synchronization.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A computer-implemented system, comprising:
a primary device comprising:
a first high accuracy timestamping assist (HATA) unit attached to a first physical layer; a first time stamping unit; a first clock control; a first medium access control layer connected to the first time stamping unit and the first physical layer via a medium independent interface (MII); and
a secondary device comprising:
a second HATA unit attached to a second physical layer; a second time stamping unit; a second clock control; a second medium access control layer connected to the second timestamping unit and the second physical layer via the MII,
wherein the first and second HATA units are configured to detect a departure time, an arrival time, or a combination thereof of a first alignment marker over TX serializer and RX deserializer interfaces of a data transmission between the primary device and the secondary device.

2. The computer-implemented system of claim 1, wherein the first and second HATA units are further configured to: measure the time delay from the first alignment marker at the TX serializer and RX deserializer interfaces of the data transmission between the primary device and the secondary device to a start of a next timestamp packet over the MII.

3. The computer-implemented system of claim 2, wherein the first and second HATA units are further configured to: map the time delay determined over the MII to the departure time, the arrival time, or a combination thereof detected over the TX serializer and RX deserializer interfaces to synchronize timestamping between the primary device and the secondary device.

4. An apparatus, comprising:
a first physical layer, a first high accuracy timestamping assist (HATA) unit, a first time stamping unit, a first clock control, and a first medium access control layer; and a second physical layer, a second HATA unit, a second time stamping unit, a second clock control, and a second medium access control layer, wherein the apparatus is configured to perform the following:

detect a departure time, an arrival time, or a combination thereof of a first alignment marker at the TX serializer and RX deserializer interfaces of a data transmission between a primary device and a secondary device;

measure time delays from the first alignment marker on the TX serializer and RX deserializer interfaces of the data transmission between the primary device and the secondary device to a start of a next timestamp packet over medium independent interfaces (MIIs); and map the time delays determined over the MIIs to the departure time, the arrival time, or a combination thereof detected over the TX serializer and RX deserializer interfaces to synchronize timestamping between the primary device and the secondary device, respectively.

5. The apparatus according to claim 4, wherein the first HATA and the second HATA are configured to continuously detect the departure time, the arrival time, or the combination thereof of the first alignment marker to obtain a time delay to the start of the next timestamp packet.

6. The apparatus according to claim 5, wherein the first HATA and the second HATA are configured to report captured timestamps to logic of the first timestamp unit and the second timestamp unit, respectively.

7. The apparatus according to claim 4, wherein the first HATA and the second HATA are located as close as possible to the first physical layer and the second physical layer, respectively.

8. A method comprising:

detecting a departure time, an arrival time, or a combination thereof of a first alignment marker at the TX serializer and RX deserializer interfaces of a data transmission between a primary device and a secondary device;

measuring the time delay from the first alignment marker on the TX serializer and RX deserializer interfaces of the data transmission between the primary device and the secondary device to a start of a next timestamp packet; and mapping the time delay determined over medium independent interfaces (MIIs) to the departure time, the arrival time, or a combination thereof detected over the TX serializer and RX deserializer interfaces to synchronize timestamping between the primary device and the secondary device, respectively.

9. The method of claim 8, further comprising:

counting a number of data blocks transmitted across the MIIs after initiating an insertion of the first alignment marker into the transmitted data stream and the start of the next timestamp packet, wherein the time delay is based on the counted number of data blocks.

10. The method according to claim 8, determining the departure time of the first alignment marker by:

detecting the first alignment marker on a first physical lane of the TX serializer interface after the first alignment marker is inserted in the transmitted data stream.

11. The method according to claim 10, wherein the departure time of the first alignment marker comprises a transmitter path system time.

12. The method according to claim 8, determining the arrival time of the first alignment matter by detecting the first alignment marker on any physical lane of the RX deserializer interface prior to removal of the first alignment marker from the received data stream.

13. The method according to claim 12, wherein the arrival time of the first alignment marker comprises a receiver path system time.

14. The method according to claim 8, wherein the departure time and the arrival time are detected on both a transmitter (TX) path and a receiver (RX) path between the primary device and the secondary device.

15. The method according to claim 8, comprising:

synchronizing the primary device and the secondary device under IEEE Standard for a Precision Clock Synchronization Protocol for Networked Measurement and Control Systems (IEEE 1588-2008) 2-step protocol.

16. A non-transitory computer-readable storage medium encoded with instructions that, when loaded into a computer, establish a machine performing a computer-implemented method of:

detecting a departure time, an arrival time, or a combination thereof of a first alignment marker at TX serializer and RX deserializer interfaces of a data transmission between a primary device and a secondary device;

measuring time delays from the first alignment marker of the data transmission between the primary device and the secondary device to the start of the next timestamp packet over medium independent interfaces (MIIs); and mapping the time delays determined over the MIIs to the departure time, the arrival time, or a combination thereof detected over the TX serializer and RX deserializer interfaces to synchronize timestamping between the primary device and the secondary device, respectively.

17. The non-transitory computer-readable storage medium of claim 16, wherein the computer implemented method further comprises:

counting a number of data blocks transmitted across the MIIs after initiating an insertion of the first alignment marker into the transmitted data stream and the start of the next timestamp packet, wherein the time delay is based on the counted number of data blocks.

18. The non-transitory computer-readable storage medium of claim 16, wherein the computer implemented method further comprises:

determining the departure time of the first alignment marker by detecting the first alignment marker on a first physical lane of the TX serializer interface after the first alignment marker is inserted in the transmitted data stream.

19. The non-transitory computer-readable storage medium of claim 18, wherein the departure time of the first alignment marker comprises a transmitter path system time.

20. The non-transitory computer-readable storage medium of claim 16, wherein the computer implemented method further comprises:

determining the arrival time of the first alignment marker by detecting the first alignment marker on any physical lane of the RX deserializer interface prior to removal of the first alignment marker from the received data stream.

21. The non-transitory computer-readable storage medium according to claim 20, wherein the arrival time of the first alignment marker comprises a receiver path system time.

22. The non-transitory computer-readable storage medium according to claim 16, wherein the departure time and the arrival time are detected on both a transmitter (TX) path and a receiver (RX) path between the primary device and the secondary device.

23. The non-transitory computer-readable storage medium of claim 16, wherein the computer implemented method further comprises:
synchronizing the primary device and the secondary device under IEEE Standard for a Precision Clock Synchronization Protocol for Networked Measurement and Control Systems (IEEE 1588-2008) 2-step protocol.

* * * * *